US006860163B2

(12) United States Patent
Tocquin et al.

(10) Patent No.: US 6,860,163 B2
(45) Date of Patent: Mar. 1, 2005

(54) DEVICE ALLOWING MEASUREMENT OF PHOTOSYNTESIS OF A WHOLE SMALL PLANT

(75) Inventors: Pierre Tocquin, Tilff (BE); Claire Perilleux, Angleur (BE)

(73) Assignee: Universite de Liege, Liege (BE)

( * ) Notice: Subject to any disclaimer, the term of this patent is extended or adjusted under 35 U.S.C. 154(b) by 0 days.

(21) Appl. No.: 10/463,811

(22) Filed: Jun. 18, 2003

(65) Prior Publication Data

US 2003/0204989 A1 Nov. 6, 2003

Related U.S. Application Data

(63) Continuation-in-part of application No. 10/096,648, filed on Mar. 14, 2002, now abandoned.

(30) Foreign Application Priority Data

Nov. 23, 2001 (EP) ............................................ 01204480

(51) Int. Cl.$^{7}$ ................................................ G01N 17/00
(52) U.S. Cl. ...................................................... 73/865.6
(58) Field of Search ................................ 73/865.6, 866

(56) References Cited

U.S. PATENT DOCUMENTS 1,989,403 A * 1/1935 Dauernheim
RE21,820 E * 6/1941 Munsell
2,463,719 A * 3/1949 Schackett et al.
4,255,896 A 3/1981 Carl .............................. 47/62
4,279,101 A 7/1981 Leroux .......................... 47/64
4,379,375 A 4/1983 Eisenberg et al. ............. 47/65
4,584,791 A 4/1986 Wolf ............................. 47/62
4,768,390 A * 9/1988 Baker et al. ............... 73/865.6
4,803,370 A 2/1989 Eckles ........................ 250/504
4,927,455 A * 5/1990 Hotta et al. ................ 71/64.13
4,976,064 A * 12/1990 Julien ............................ 47/63
5,016,548 A * 5/1991 Ito ............................. 111/114
5,225,342 A * 7/1993 Farrell ................... 435/240.45
5,269,094 A * 12/1993 Wolverton et al. ............. 47/62
5,332,901 A 7/1994 Eckles et al. ............... 250/345
5,339,566 A * 8/1994 Cormier ........................ 47/87
5,340,987 A 8/1994 Eckles et al. ............... 250/345
5,385,589 A * 1/1995 Kratky .......................... 47/58
5,394,647 A 3/1995 Blackford, Jr. ................ 47/62
5,457,320 A 10/1995 Eckles et al. ............... 250/345
5,472,458 A * 12/1995 Ogawa et al. ............... 47/1.01
5,870,854 A * 2/1999 Wilkins ......................... 47/58

FOREIGN PATENT DOCUMENTS

DE 3341103 A1 * 5/1985 .......... A01G/31/02
EP 52264 A1 * 10/1981 .......... A01G/31/02

OTHER PUBLICATIONS

A Hydroponic Method for Cultring Populations of Arabidopsis, by Ernst et al; vol. 18, http://www.arabidopsis.org/ais/1981/ernst–1981–aactp.html, 1981, 5 pages.*

* cited by examiner

*Primary Examiner*—Robert Raevis
(74) *Attorney, Agent, or Firm*—Jacobson Holman PLLC

(57) ABSTRACT

The present invention is related to a device for the measurement of the photosynthesis of a whole small plant, which comprises:

- a rigid base of very low thickness that fits between the plant and its substrate in order to isolate it from the inside of a chamber,
- a central unit containing all the electronic and mechanical equipment required for the functioning of the chamber,
- a chamber that is a container whose size and volume are adapted at the same time to the central unit, to its base, and to the size of the plant to be studied.

9 Claims, 3 Drawing Sheets

FIG. 1
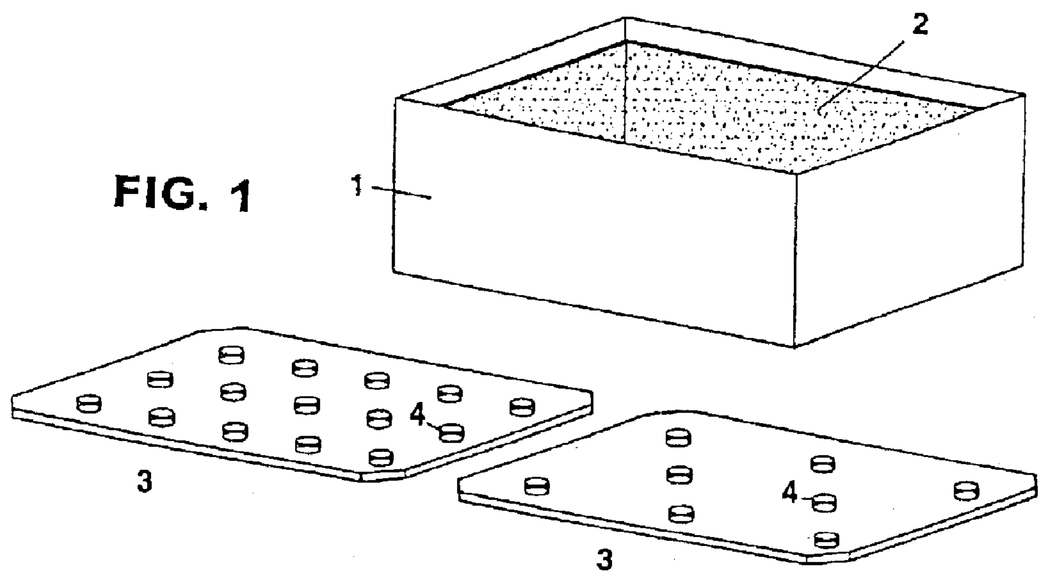
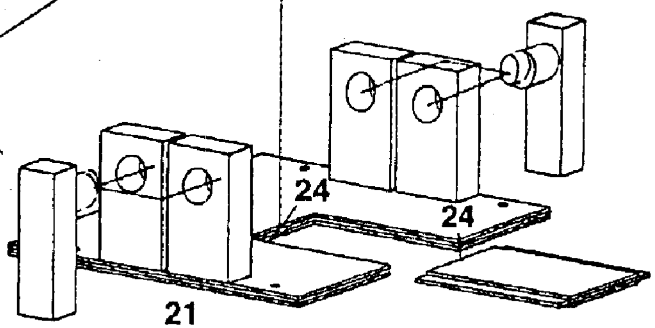
FIG. 3

DEVICE ALLOWING MEASUREMENT OF PHOTOSYNTESIS OF A WHOLE SMALL PLANT

This is a continuation-in-part of U.S. Ser. No. 10/096,648 filed Mar. 14, 2002 now abandoned.

FIELD OF THE INVENTION

The present invention is related to a device allowing measurement of photosyntesis of a whole small plant of *Arabidopsis thaliana* type, whatever the stage of its growth. Technological Background and State of the Art of the Invention

*Arabidopsis thaliana* is a small plant belonging to family of Brassicaceae that has no specific agronomical interest. Nevertheless, some of its characteristics offer undeniable advantages for many researches in plant biology, particularly in genetics and molecular biology.

Amongst these characteristics are its:

- small size, allowing its culture in small spaces,
- easy growth and the possibility of collecting many of seeds,
- rapid development (about 6 weeks from seeds to seeds),
- small size of the genome, of which more than 95% of the sequence is known to date,
- availability of a great number of mutants, and
- easiness of its genetic transformation.

Such advantages have made it a model organism and a model plant for the genetic and molecular studies of plants and favoured generalisation of its use in the scientific community. Proof of this is that the number of scientific publications concerning *Arabidopsis thaliana* is more important than those related to species with agronomical interest such as tobacco, corn, wheat, or rice. Use of such a model plant allows a better integration of results obtained by different groups working at a whole plant's level, cells or genes.

However, *Arabidopsis thaliana* presents some disadvantages for physiological studies. For example, its small size and its rosette shape are obstacles for physiological investigations like leaf or whole plant measurement of gas exchanges.

Photosynthesis is a basic metabolism of plants' life. It ensures the conversion of light energy and carbon dioxide ($CO_2$) into sugar molecules that supply all the plant with indispensable energy for its accomplishment of multiple metabolic reactions necessary for its subsistence and its development.

Consequently, photosynthesis study is of major interest in agronomy and in plant biology research because its efficiency determines grown species yield.

More recently, a need to study photosynthesis has been reinforced by a growing interest of the scientific community for problems of climatic changes. In fact, the main cause of these changes is a foreseeable and important increase of carbon dioxide in the atmosphere during next century. Photosynthesis is then a main metabolism to be affected by this increase. Photosynthesis thus controls a general response of the plant to these environmental modifications.

In this context, techniques are developed to measure in vivo—in a non-destructive way—the photosynthesis of plants on the grounds (fields, forests . . . ) or in a laboratory.

In general, a part of a leaf or a whole leaf is isolated in a gas tight chamber—generally named "chamber"—made airtight to an outside atmosphere. A flux of air is produced in this chamber and a device allowing the measurement of a quantity of carbon dioxide is used to analyse air before and after it has passed over a surface of the leaf. The difference between these 2 measurements is revealing of photosynthetic activity (fixation of $CO_2$) of the leaf enclosed in the chamber.

The chamber is generally designed to enclose only a portion of the leaf. It is then often of a small size and volume, which ensures the accomplishment of precise and rapid measurements. On the other hand, as the leaf fills the chamber's surface the leaf surface used in the measuring is directly known (surface of the chamber).

This principle implies that this type of chamber is usable for a large number of plants, the only restraint being the size of the leaf to be used.

However, this type of measurements has some disadvantages. In fact, all the leaves of a same plant do not present the same photosynthetic performances: their age, the environmental conditions in which they are (shade, sunlight . . . ) or even diseases that can affect them are also parameters that can modify their photosynthesis.

Sometimes even the photosynthetic activity can vary in the same leaf: this is notably the case of the monocotyledons, where cells are older the nearer to the tip of the leaf they are.

It seems that if this type of chamber allows precise and rapid measurements it is nevertheless necessary to reproduce them several times on different leaves to asses the global situation of the plant.

There is then an undeniable advantage in being able to carry out directly the measurement of photosynthetic activity of a whole plant. Nevertheless, in this case numerous obstacles have to be overcome: the plants of an important size or of a complex form make it difficult to assemble a chamber allowing to keep a sufficient airtightness and to be able to precisely control a flux of air.

On the other hand, light intensity that reaches the leaves can be more difficult to estimate as well as the leaf surface contained in the chamber.

Finally, how bigger the volume of the chamber, how longer the measurement requires to be performed until it becomes practically impossible.

In this context *Arabidopsis thaliana* is an ideal plant to carry out this type of measurement: it is small and of simple form (rosette), which thus presents little problems for controlling air flux or an estimation of a quantity of light received by the plant and its leaf surface.

However, being largely used throughout the world, this model plant is grown in very varied growing systems: in pots, boxes, on mould or in hydroponics. . . It is then necessary to be able to have a chamber that is independent of growth conditions used.

On the other hand, the whole life cycle of this plant should be studied. Given that the precision and rapidity of the measurements are weaker the bigger the volume of the chamber and the surface of the plant are, a chamber designed for adult plants will be inefficient for the measurement of young plants.

BRIEF DESCRIPTION OF THE DRAWINGS

FIG. 1 schematically illustrates an experimental unit 1 with its moveable lid 3 for the growing of a variable number of plants through a variable number of perforations 4.

FIG. 3 schematically illustrates a device 20 allowing measurement of photosynthesis of a whole small plant.

SUMMARY OF THE INVENTION

Figure 2:
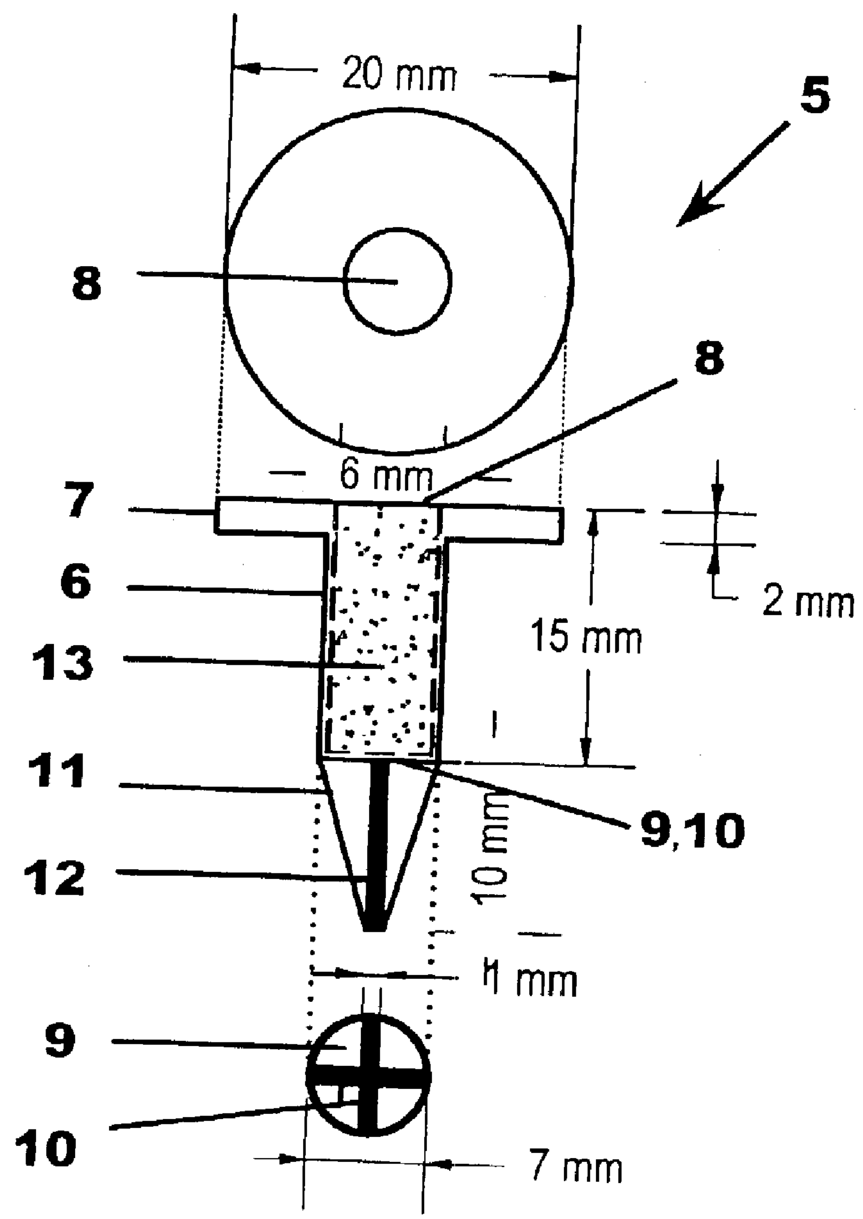
FIG. 2 schematically illustrates a moveable support of a plant.

The present invention is related to a device 20 allowing the measurement of the photosynthesis of a whole small plant, of the *Arabidopsis thaliana* type, whatever the stage of its growth.

The device 20 according to the invention comprises three pieces made from materials, preferably from glass and aluminium, which characteristics are compatible with the type of measurements to be done (weak adsorption of water vapour and carbon dioxide, no modification of the quality or quantity of light reaching the plant . . . ):

- a rigid base 21 of very low thickness (of about 3 mm or less) that fits between the plant and a substrate in order to isolate it from the inside of a chamber 23,
- a central unit 22 containing all the electronic and mechanical equipment required for functioning of the chamber (elements well known by a person skilled in the art, which allow fixation of $CO_2$ measurements),
- a chamber 23 that is a container whose size and volume are adapted at the same time to the central unit 22, to its base 21, and to the size of the plant to be studied, particularly *Arabidopsis thaliana.*

The base 21 is advantageously supplied with a perforation 24 allowing insertion of at least a stem of the plant or a support 5 for the plant described hereafter. Furthermore, the base 21 allows to make the device 20 completely independent of the growing system used, at the same time forms a complete isolation of the plant from its substrate.

Another aspect of the present invention concerns a kit of parts for the quantification of the photosynthesis comprising the device 20 of the invention as well as a set of different chambers 23, 23' of increasing size and volume and possibly of different shape, adapted to a central unit 22 and to the base 21, and that may be adapted to the size of the plant, in particular the different stages of a growing plant such as *Arabidopsis thaliana.*

Furthermore, the central unit 22 and the chamber 23 are designed in a way to ensure a homogeneous flux of air and of a controlled force in order to ensure reliable and reproducible measurements. To this end, the device 20 and kit may comprise other elements such as mini-fans (not represented) ensuring an efficient and uniform flux of the air in the chamber 23.

Figure 4:
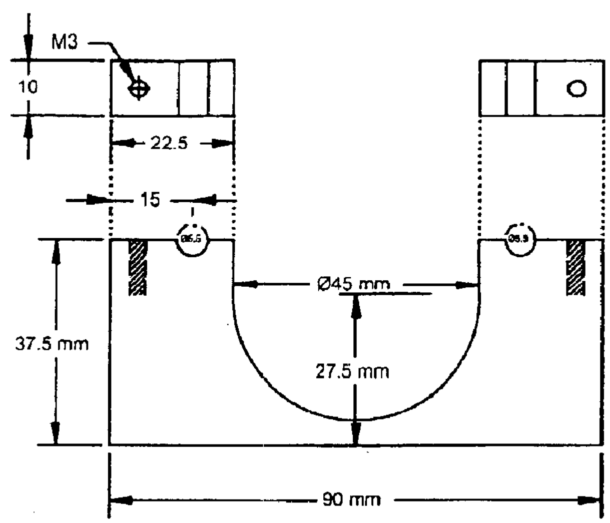
FIG. 4 schematically represents a cross-section of chambers belonging to the central unit of a device according to the invention.
Figure 5:
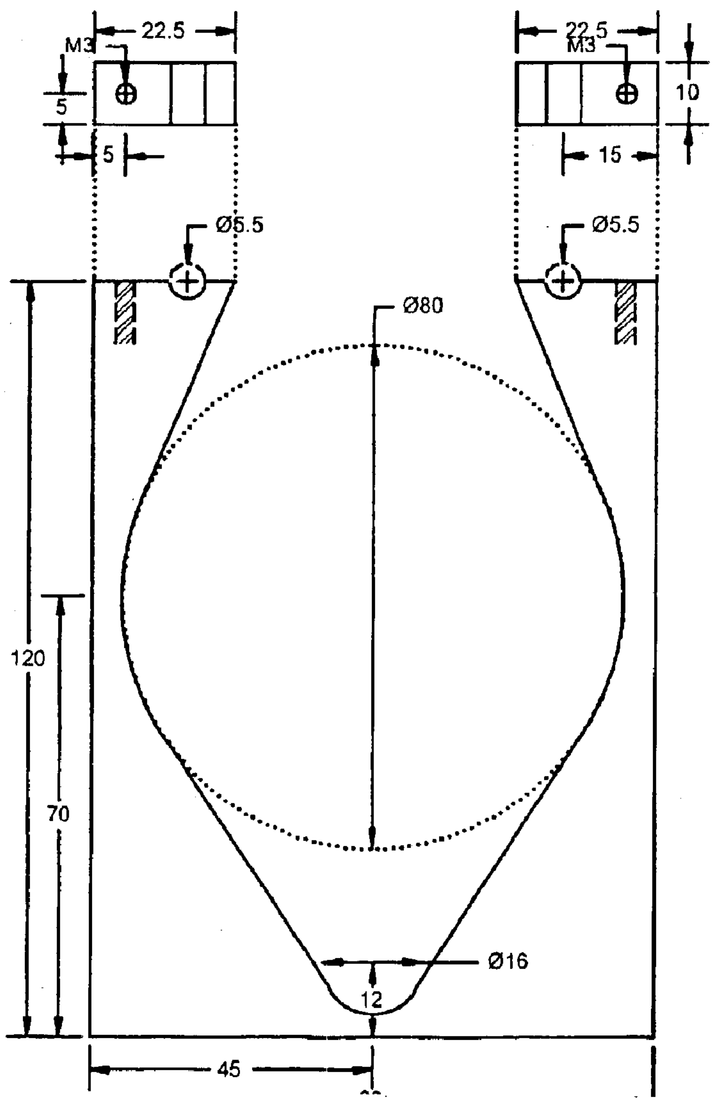
FIG. 5 schematically represents a cross-section of chambers belonging to the central unit, the cross-section being different than the cross-section of FIG. 4.

The FIGS. 4 and 5 present 2 examples of chambers 23 and 23' which present a cross-section, an essentially circular form which ensures an homogenous flux of air in the chambers.

Finally, as above-mentioned, the perforation 24 present in the base 21 is adequate for the insertion of the support 5 of the plant.

Such supports 5 are composed of a tubular body 6 having preferably a cylindrical form or another configuration appropriate for said perforation 4. They are supplied at their top end with a neck 7, preferably of an essentially cylindrical form surrounding the top opening 8 of the tubular body 6 in order to keep it in the corresponding perforation 4. The other end of the tubular body 6 also comprises a bottom opening 9 sometimes ended by a grid 10. Preferably, this grid 10 is formed by the intersection of two protuberances 11 and 12 prolonging the tubular body 6 (such as represented in FIG. 2).

Advantageously, for the growing of *Arabidopsis thaliana* and as represented in FIG. 2, the length of the tubular body 6 is about 15 mm, its diameter is about 7 mm, the diameter of the neck 7 is about 20 mm, and its thickness is about 2 mm. Preferably, the top and bottom openings (8 and 9) of the tubular body 6 are about 6 mm, the protuberances 11 and 12 forming the grid 10 at the bottom opening of the tubular body 6 have a thickness of about 1 mm.

According to the invention the support 5 of the plant is made in one piece by plastic injection in a mould or by any other conventional technique.

The tubular body 6 contains preferably an inert solid medium 13 (agar gel) of common use for growing plants. The use of agar allows to control the humidity at the germinating seed level and to have a non-contaminated and ideal inert support for the development of the seedling (particularly the roots) before it comes into contact with the growing liquid medium. Furthermore, the agar presents the advantage of being a soft support that allows the integral sampling of the plant without damage to the plant and at any time of its growth.

The present invention concerns a growing device that combines advantageously a hydroponic growing medium and an inert support (for example, agar) for plants.

Such a device represented in FIGS. 1 and 2 is made with inert and opaque materials (for example, black PVC), preferably dyed in the mass in order to eliminate a risk of flaking of a paint that could then contaminate the nutritional solutions, at the same time guaranteeing a longer life span of each element of the device.

Said device comprises a container 1 containing a hydroponic growing medium 2 and sometimes connection systems allowing connection of the containers and/or the continuous renewal of hydroponic growing mediums (not represented).

Said container 1 comprises a moveable lid or plate 3 supplied with perforations or holes 4 able to receive the supports 5 of said plants.

The device of the invention is particularly well adapted to a scientific use because it is modular and thus adaptable to any growing structure (incubator, air-conditioned chambers, greenhouses, etc.) but equally to any experimental need and allows notably the individual manipulation of the plants maintained on the support.

In fact, each container 1 is an experimental unit that can contain a variable number of plants (for example such as represented in FIG. 1, the device can support 1 to 44 plants) subjected to identical environmental and nutritional conditions.

Furthermore, inside each container 1 each plant develops on a moveable support 5. Each plant can then be at any time isolated from one container and replaced in this same container or in another. The same operation can be done for all the plants in a container simultaneously by manipulating the moveable lid 3 of the container.

Furthermore, the manipulation and transport of a container or a small group of containers are facilitated by its small size. This allows its integration to any growing structure but also to modify at one's choice the environmental conditions that the plants undergo when transferring them from one environment to another.

On the other hand, it is well understood that the device of the invention can be combined to other elements facilitating the assembly and maintenance of the growing such as canalisations, pumps, automatic filling systems of the supports 5, etc.

What is claimed is:

1. A device for the measurement of the photosynthesis of a whole small plant, which comprises:

a thin and rigid base that fits between the plant and a substrate for growing the plant in order to isolate the substrate from the inside of a chamber, a central unit containing all the electronic and mechanical equipment required for the functioning of the chamber, and a chamber that is a container adapted in shape and dimension to fit tightly to the central unit, the thin and rigid base, and the plant to be studied.

2. The device according to the claim 1, wherein the base comprises a perforation allowing the insertion of at least a stem of the plant or a solid support of said plant.

3. The device according to the claim 2, wherein the plant support is composed of a neck surrounding the top opening of a tubular body and comprising a bottom opening optionally ended by a grid.

4. The device according to the claim 3, wherein the grid of the support is formed by the intersection of 2 protuberances in pointed form prolonging the tubular body.

5. The device according to the claim 1, wherein the rigid base presents a thickness comprised between about 3 mm and about 0.1 mm.

6. The device according to the claim 1 wherein the rigid base, the central unit and the chamber are made from materials which present a weak adsorption of water vapour and carbon dioxide and no modification of the quality or quantity of light reaching the plant.

7. The device according to the claim 6, wherein the rigid base, the central unit and the chamber are made from glass and aluminium.

8. The device according to the claim 1, wherein the plant is *Arabidopsis thaliana*.

9. A kit of parts for the quantification of photosynthesis of a plant, comprising the device according to the claim 1 and a set of different chambers of increasing size and volume and of different shape, said different chambers being adapted in shape and dimension to fit tightly to the central unit and to the base and adapted to the size of the plant.

* * * * *